United States Patent [19]
Vanwingerden

[11] Patent Number: 5,927,009
[45] Date of Patent: Jul. 27, 1999

[54] PLANT CARRIER WITH PULL-OUT REMOVER

[76] Inventor: Leonard Vanwingerden, 216 Stafford Rd., Somers, Conn. 06071

[21] Appl. No.: 09/010,242

[22] Filed: Jan. 21, 1998

Related U.S. Application Data

[60] Provisional application No. 60/045,654, May 5, 1997.

[51] Int. Cl.[6] .............................. A01G 23/02; A01G 9/02
[52] U.S. Cl. .................................. 47/73; 47/66.1
[58] Field of Search .................. 47/86, 87, 66.6, 47/73

[56] References Cited

U.S. PATENT DOCUMENTS

| | | | |
|---|---|---|---|
| 1,144,559 | 6/1915 | Mendelson et al. | 206/804 |
| 3,593,845 | 7/1971 | Schwartz | 206/804 |
| 4,223,480 | 9/1980 | Welty | 47/73 |
| 4,495,725 | 1/1985 | Talbott | 47/85 |
| 4,517,206 | 5/1985 | Murphy et al. | 206/804 |
| 5,022,183 | 6/1991 | Bohlmann | 47/86 |
| 5,161,710 | 11/1992 | Chumley | 220/754 |
| 5,213,857 | 5/1993 | Erkkila | 428/34.1 |
| 5,330,056 | 7/1994 | De La Rocha | 206/804 |
| 5,419,080 | 5/1995 | Buss et al. | 47/87 |
| 5,438,796 | 8/1995 | Nathan | 47/66 |
| 5,467,894 | 11/1995 | Altonen et al. | 206/804 |
| 5,664,370 | 9/1997 | Boudreau et al. | 47/87 |

FOREIGN PATENT DOCUMENTS

| | | | |
|---|---|---|---|
| 2642266 | 8/1990 | France | 47/66.6 |
| 2017100 | 10/1970 | Germany | 47/86 |
| 737660 | 9/1955 | United Kingdom | 47/86 |
| 2263052 | 7/1993 | United Kingdom | 47/66.6 |

OTHER PUBLICATIONS

"Plantpak Grower Products", Packs you can afford . . . grow, 1983, edition, pp. 1–8, Nov. 1982.

Primary Examiner—Michael J. Carone
Assistant Examiner—Fredrick T. French, III
Attorney, Agent, or Firm—Donald S. Holland, Esq; Holland & Bonzagni, P.C.

[57] ABSTRACT

A system of plastic plant trays is disclosed for conveniently transporting, displaying and removing (for planting) young plants or seedlings. In the preferred embodiment, each tray comprises a plurality of cells for removably housing the plants; unique pull-out tabs for gently lifting plants atop them from individual cells; and a color-coded handle that identifies the price of the plants. By pulling up on a dangling end of a tab, a gardener can lift and later extract a plant with minimal damage to its roots or flowers.

8 Claims, 3 Drawing Sheets

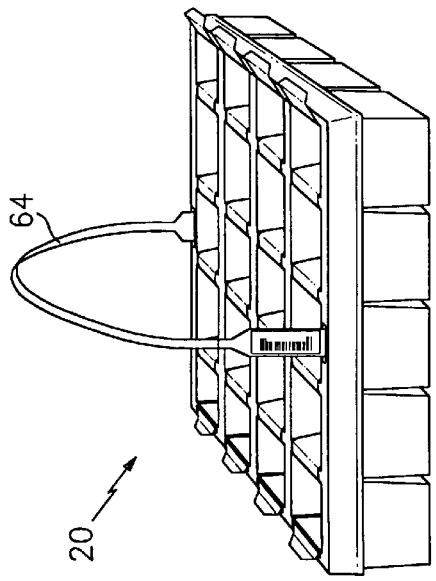
FIG. 6
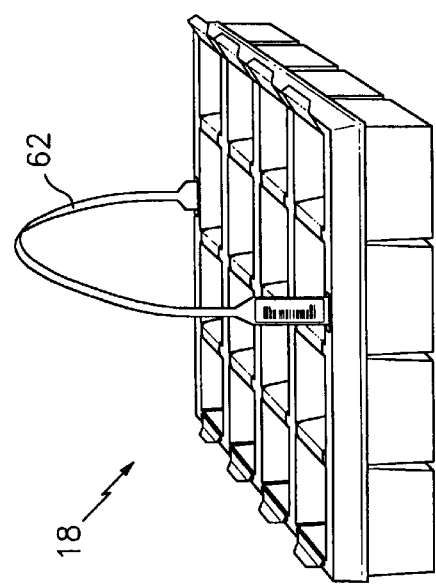
FIG. 5
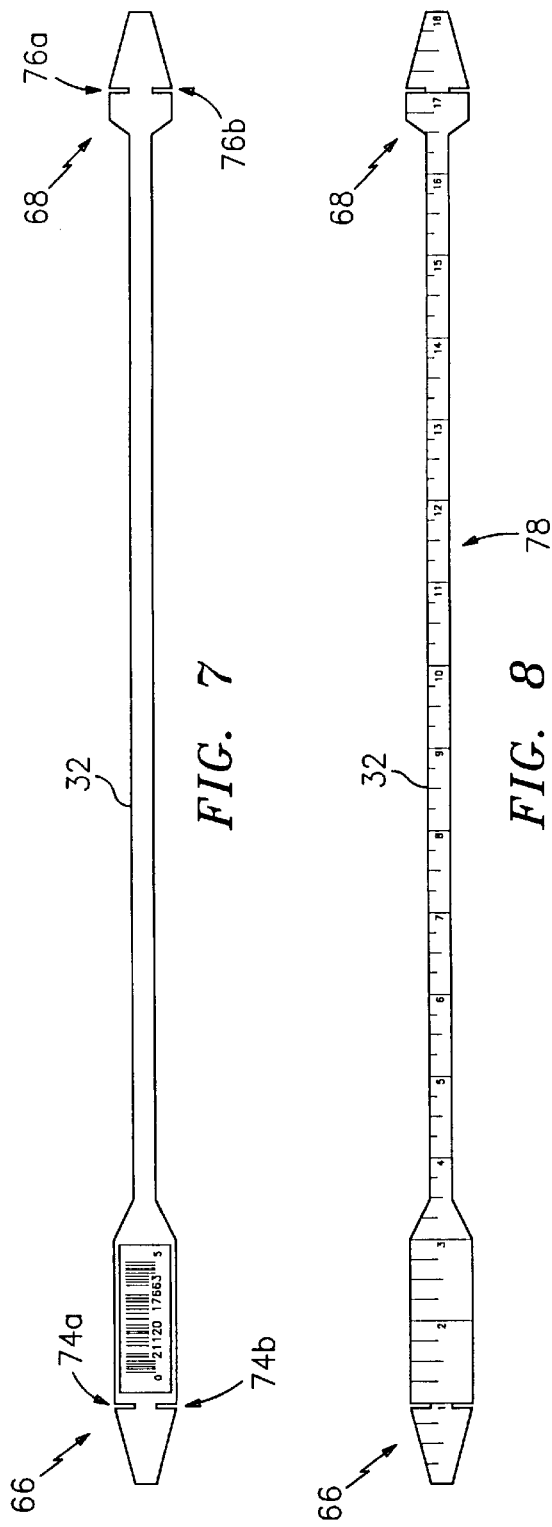
FIG. 7
FIG. 8

PLANT CARRIER WITH PULL-OUT REMOVER

This "regular" patent application is based (in part) upon a "provisional" patent application, entitled "POP-UP REMOVER FOR PLANTS", application Ser. No. 60/045,654, filed May 5, 1997, by the same inventor.

BACKGROUND OF THE INVENTION

This invention relates to the removal of garden plants or seedlings from plastic trays. More specifically, it deals with a simple system by which young plants or seedlings can be lifted without the soil bases crumbling or the roots or flowers being damaged.

Young garden plants are typically displayed and sold to customers in plastic containers. Those containers are sometimes individual units. More often, they are removably linked together (e.g, by scored or perforated tabs) to form a chain of cell packs. The chain can be broken anywhere along its length. That enables a user to purchase only the amount desired.

Cell packs assist customers, but they present multiple problems for retailers. Customers often leave displays in disarray, upon breaking off a string of such packs. This gives the impression that the plants are not being attended to or nourished. Constant maintenance is required to keep the displays attractive so that customers will purchase items from them.

The following illustrates a typical scene at garden centers: a novice gardener spots the orange marigolds she has been looking for in the retailer's just stocked plant display. As she reaches in to break off the desired "chain amount" of packs, her handbag dangles from her arm, snapping blooms from the adjacent flat of plants. The desired string of packs resists breaking loose from the remainder of the chain in the flat. Finally it rips loose, pulling two or more packs up, out of the flat, left lying askew against some more broken marigolds.

The problem does not stop there! Our novice gardener now is home ready to plant her orange marigolds. She is afraid to pull hard on the plants to extract them from the cells: they may break. Pushing from the bottom of a cell causes the plastic frame to wrinkle. Finally she goes inside, gets a pair of scissors and snips the plastic from around the plant.

Accordingly, it is a principal object of the present invention to provide a system of plant trays that overcomes the deficiencies of the prior art.

It is another general object to provide a simple system of plastic trays, with different plant counts, by which young plants or seedlings can be removed or lifted without the soil bases crumbling or the roots or flowers being damaged.

It is a more specific object to provide such a system with pull-out tabs to gently lift the plants from their individual cells.

It is yet another object to provide a series of trays, commensurate with the above-listed objects, that are identical in width and length to assist retailers in maintaining the ordered appearance of displays.

SUMMARY OF THE INVENTION

A unique system of plant trays is disclosed for the easy removal of plants or seedlings without the soil bases crumbling or the roots or flowers being damaged. In the preferred embodiment, the trays are plastic. They are constant in overall width and length; but, they contain different numbered cells to house multiple counts of various sized plants. For example, a four-cell tray (a.k.a. "pack"), constructed in accordance with this invention, houses four plants that are proportionally larger than the smaller plants housed in a six-pack.

Each tray has multiple rows of cells. Pull-out ribbon-like tabs are located under the plants housed in the cells. Each tab is removably attached, at one end, to a wall of the tray, while the other tab end extends freely over an opposing wall. A user can remove a plant from a cell for potting or planting by lifting the free end. This gently pops up the plant with minimal damage.

The trays also preferably have different colored handles that identify the sizes of the plants housed, plus their prices. Each handle has a ruler on its reverse side to assist the user in planting the seedlings the appropriate distance apart in his/her garden.

The above and other objects and advantages may become more readily apparent upon viewing the accompanying drawings and reading the more detailed description that follows.

BRIEF DESCRIPTION OF THE DRAWINGS

FIGS. 1–6 are top perspective views of various cell packs, constructed in accordance with the present invention, which are designed to house different counts of various sized plants;

FIGS. 7–8 illustrate the front and back, respectively, of a carrying handle for one of the packs;

DETAILED DESCRIPTION OF THE PREFERRED EMBODIMENT

Figure 1:
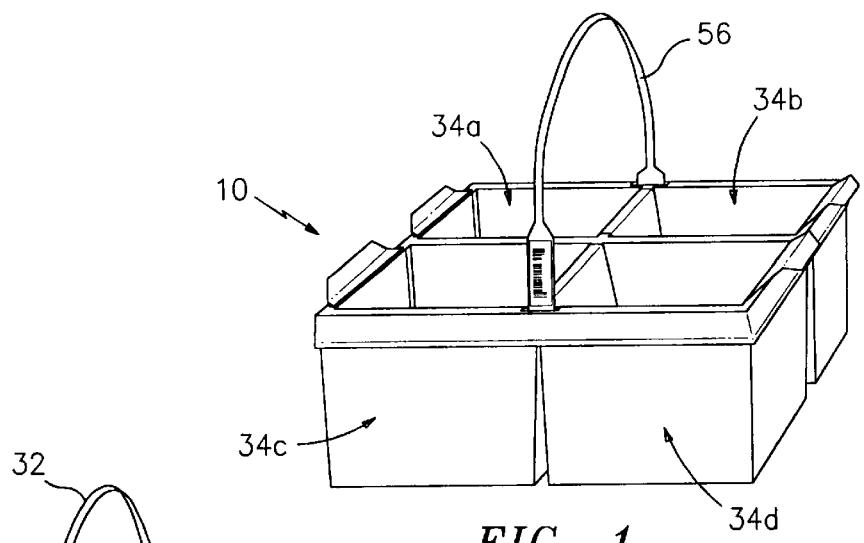

Referring to the drawing in detail, a system of plastic plant trays is exemplified in FIGS. 1–6, with these trays being generally designated by the reference numerals 10, 12, 14, 16, 18 and 20. The trays are marketed under the trademark WING™ PAK by GROWER DIRECT® of Somers, Conn.

In the preferred embodiment, each tray (e.g., 12) comprises a plurality of cells (e.g., 22a–22f) for removably housing young plants or seedlings (e.g., 24, 26, 28); pull-out tabs (e.g., 30a, 30b) for gently lifting the plants from their individual cells; and a color-coded handle (e.g., 32) that identifies the price of the plants.

Figure 10:
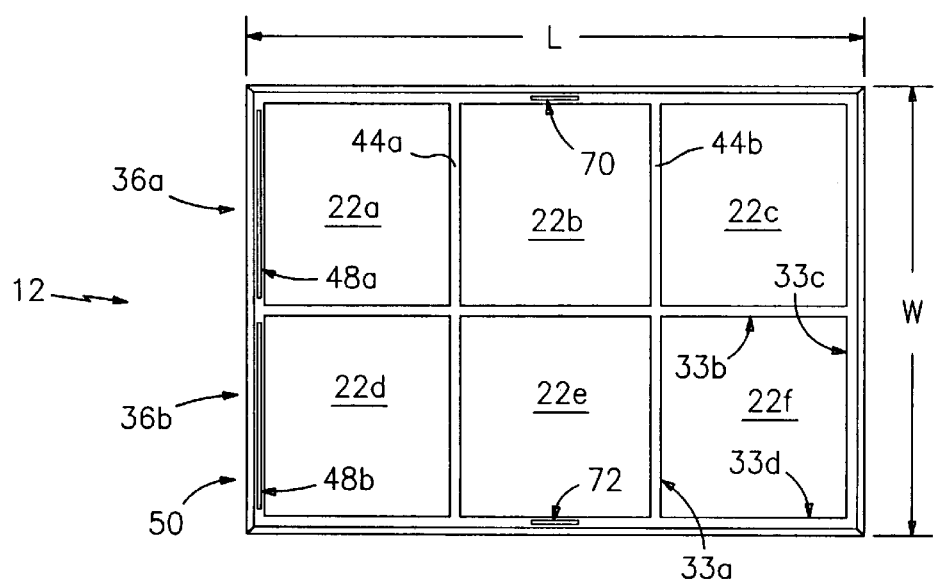
FIG. 10 illustrates an overhead view of the six-pack of FIG. 2, but with the plants and tabs removed for clarity.

As best shown in FIG. 10, each tray (e.g., 12) has the same length L and width W as the other trays (10, 14, 16, 18, 20) in the series. Their cells (e.g., 22f) have side and bottom walls (e.g., 33a–d) and top openings.

Figure 2:
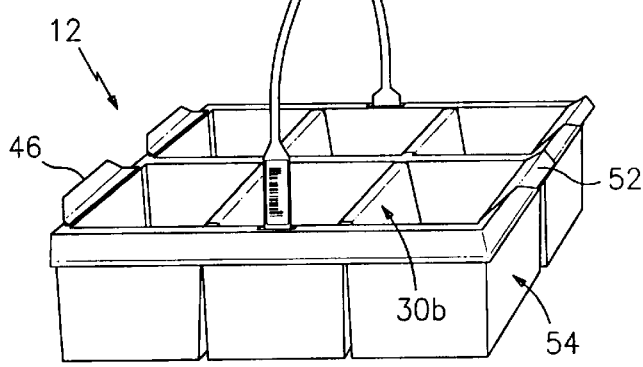
Figure 3:
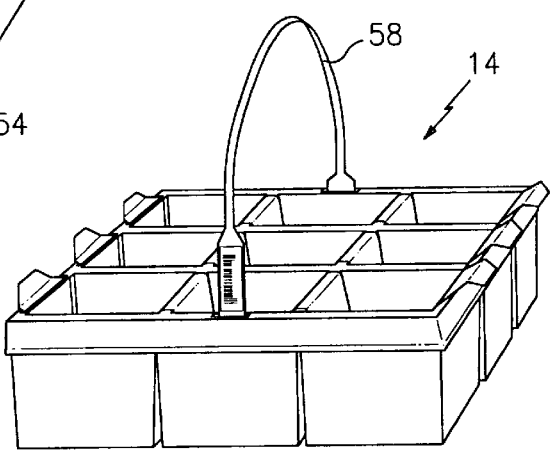
Figure 4:
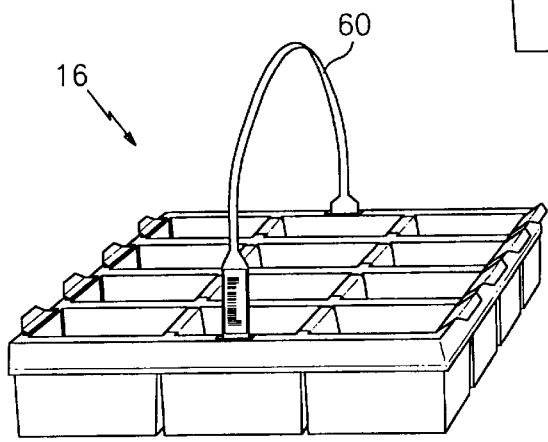

The illustrated trays have different plant counts (i.e., their number of cells differ). For example, FIG. 1 shows a tray 10 with four cells 34a–d. It is called a four-pack. FIG. 2 shows a tray 12 with six cells 22a–f that are smaller or shorter, to house smaller species of plants.

Similarly, looking at FIGS. 3, 4, 5 and 6, trays 14, 16, 18, 20 are designed to house progressively smaller plants (not shown), but the number of cells in each increases. Tray 14 depicts a nine-pack; tray 16 a sixteen-pack; and tray 20 a twenty-pack.

This plant packaging system incorporates a one size fits all approach; yet there is maximum flexibility. Using trays with different plant counts, the system is able to handle a wide selection of garden plants. Yet each species takes up the same space on a display flat (or shelf) because one size fits all.

Aside from their uniform perimeters, each tray includes the unique pull-out tabs mentioned above (e.g., 30a, 30b). These tabs allow a gardener to gently lift a plant (e.g., 28) out of its cell for removal and planting without damaging the foliage or any delicate root structure. How this is accomplished is best shown in FIGS. 9 and 10.

Figure 9:
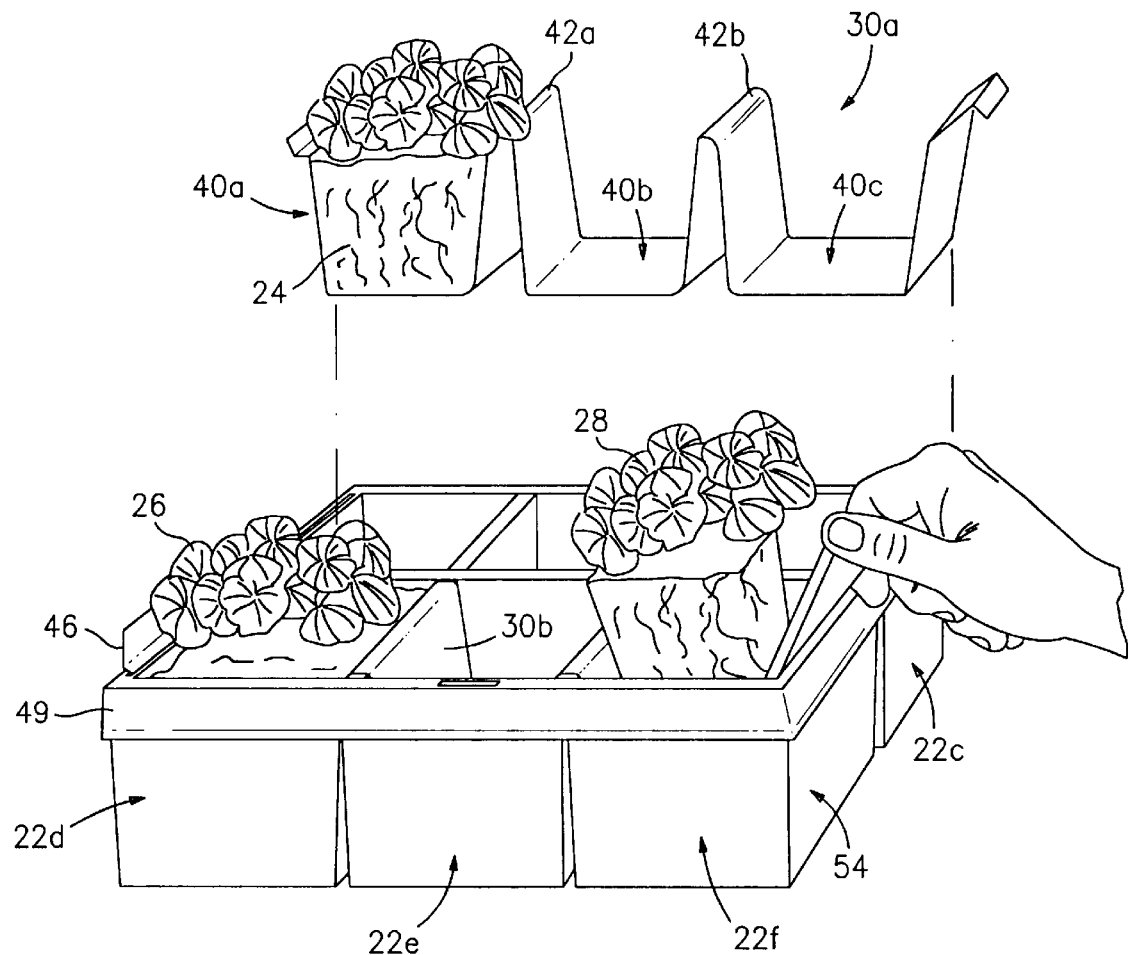
FIG. 9 is an enlarged view of a six-pack, shown in FIG. 2, with a pull-out tab suspended above and some representative plants being shown.

FIG. 9 depicts tray 12, which is a six-pack with two identical rows 36a, 36b of three cells 22a–c, 22d–f. Identical tabs 30a, 30b are designed to fit into these rows.

Each tab is preferably made of plastic. Each has pre-formed U-shaped supports (e.g., 40a, 40b, 40c) that are interconnected by horizontal shoulders (e.g., 42a, 42b). These shoulders are adapted to straddle the tops (e.g., 44a, 44b) of walls between adjacent cells.

First, the ribbon-like tab (e.g., 30b) is lowered into a row (e.g., 36b) of cells. Then, a truncated-V-shaped insert end 46 is threaded under and up through a slit (e.g., 48a or 48b) in an overhanging rim 49. This rim is integral with the outermost left-hand wall (e.g., 50) of that cell row (36a or 36b); and it extends around the entire tray, as best shown in FIG. 9.

While the tab's insert end 46 is held within the slit (e.g., 48a or 48b), the tab's opposite end (e.g., 52) is allowed to freely drape over the outermost right-hand wall (e.g., 54) of that cell row (e.g., 36b). This free end (e.g., 52) can be easily grabbed between a user's thumb and forefinger (see FIG. 9), when desired. Note that the insert end 46 provides a gentle fulcrum for removing a plant (e.g., 26) from the last or left-hand cell (e.g., 22a).

Once the insert end 46 is secured, soil media is poured into the cells (e.g., 22d–f), atop the tab (e.g., 30b). Then, transplants (e.g., 26, 28) are placed into the soil filled cells, where they are typically allowed to grow. At the time of sufficient growth, the packs are transported to the retailer's establishment for display and sale.

The display is assisted through the use of different colored handles 32, 56, 58, 60, 62, 64 (color not shown). Each color denotes a sales price to the retailer and allows him/her to determine the retail selling price by color. Any colors could be chosen, and Applicant believes that his arbitrary color scheme identifies his system.

Each handle 32, 56, 58, 60, 62, 64 has pronged ends (e.g., 66, 68) resembling truncated arrowheads. These ends enable the handles to be removably held within two slots (e.g., 70, 72) on opposite sides of the trays, near their mid-lengths (see FIG. 10). Notches (e.g., 74a–b, 76a–b) provide flexibility of the handle for comfortable carrying.

Along with the easy-to-use color coding on each of his handles, Applicant has imprinted a convenient ruler 78 on the back of every handle for experts and novices alike to use. No more guess work as to how far apart or how deep to plant your plants.

It should be understood by those skilled in the art that obvious structural modifications can be made without departing from the spirit or scope of the invention. For example, the pull-out tabs (e.g., 30a, 30b) could be made of pre-formed, wax impregnated paper. Or, they could be single U's. Accordingly, reference should be made primarily to the accompanying claims, rather than the foregoing specification, to determine the scope of the invention.

Having thus described the invention, what is claimed is:
1. A plant tray comprising:
   a. at least one row of integrally connected cells in the tray, wherein each cell has a plurality of side walls, a bottom wall, and a top opening, and the row of cells has a beginning and an end;
   b. a plurality of plants respectively housed within individual cells, wherein the plants have soil bases and roots; and
   c. means for gently lifting the plants from their individual cells without the soil bases crumbling and the roots being damaged and means comprising:
      (i) a pull-out tab that lines the row of cells with plants resting atop the tab, wherein the tab has pre-formed generally U-shaped supports that sit within the cells, with the plants respectively housed within individual U-shaped supports, wherein the soil bases of the housed plants are in direct contact with the U-shaped supports;
      (ii) the U-shaped supports are interconnected by shoulders that straddle tops of side walls between adjacent cells;
      (iii) the tab has two ends, wherein one tab end is adjacent the beginning of the row of cells and the other tab end is a free end that extends beyond the end of the row of cells, over the tray, wherein the free end is adapted in size and shape to be grasped by a person's thumb and forefinger and lifted with the supports remaining generally U-shaped; and
      (iv) the U-shaped supports each have a base, two opposing side walls, two opposing side openings and a top opening, whereby the soil bases of plants housed within the U-shaped supports are accessible directly through the side openings for removal of the plants from their respective supports.

2. The plant tray of claim 1 wherein the entire tray, including the pull-out tab, is made of plastic, whereby the U-shaped supports retain their shape upon the tab being lifted.

3. The plant tray of claim 1 wherein the one tab end is attached to the tray by an insert portion of the tab that is housed within a slit in the tray.

4. A plant tray comprising:
   a. at least one row of integrally connected cells in the tray, wherein each cell has a plurality of side walls, a bottom wall, and a top opening, and the row of cells has a beginning and an end;
   b. a plurality of plants respectively housed within individual cells, wherein the plants have soil bases and roots; and
   c. means for gently lifting the plants from their individual cells without the soil bases crumbling and the roots being damaged and means comprising:
      (i) a pull-out tab that lines the row of cells with plants resting atop the tab, wherein the tab has pre-formed generally U-shaped supports that sit within the cells, with the plants respectively housed within individual U-shaped supports, wherein the soil bases of the housed plants are in direct contact with the U-shaped supports;
      (ii) the U-shaped supports are interconnected by shoulders that straddle tops of side walls between adjacent cells;
      (iii) the tab has two ends, wherein one tab end is a free end that extends beyond the end of the row of cells, over the tray, wherein the free end is adapted in size and shape to be grasped by a person's thumb and forefinger and lifted with the supports remaining generally U-shaped; and (iv) the U-shaped supports each have a base, two opposing side walls, two opposing side openings and a top opening, whereby the soil bases of plants housed within the U-shaped supports are accessible directly through the side openings for removal of the plants from their respective supports.

5. The plant tray of claim 4 wherein the entire tray, including the pull-out tab, is made of plastic, whereby the U-shaped supports retain their shape upon the tab being lifted.

6. The plant tray of claim 4 wherein the one tab end is attached to the tray, adjacent the beginning of the row of cells, by an insert portion of the tab that is housed within a slit in the tray.

7. A device comprising:
   a. at least one cell having four side walls, a bottom wall and a top opening;
   b. a plant housed within the cell, wherein the plant has a soil base and roots; and
   c. means for gently lifting the plant from the cell without the soil base crumbling and the roots being damaged, and means comprising:
      (i) a pull-out tab having a pre-formed generally U-shaped support that sits within the cell with the plant resting atop the support, wherein the soil base of the housed plant is in direct contact with the U-shaped support;
      (ii) the tab has at least one free end that extends beyond the cell, wherein the free end is adapted in size and shaped to be grasped by a person's thumb and forefinger and lifted with the plant within the support; and
      (iii) the U-shaped support has a base, two opposing side walls, two opposing side openings and a top opening, whereby the soil base of the plant housed within the support is accessible directly through the side openings for removal of the plant from the support.

8. The tray of claim 7 wherein the entire device, including the U-shaped support, is made of plastic, whereby the U-shaped support retains its shape upon being lifted.

* * * * *